United States Patent [19]
Barnowski

[11] Patent Number: 5,351,714
[45] Date of Patent: Oct. 4, 1994

[54] SAFETY VALVE FOR HIGH-PRESSURE PUMPS, HIGH-PRESSURE WATER-JET MACHINES AND THE LIKE

[75] Inventor: Ulrich Barnowski, Oelde, Fed. Rep. of Germany

[73] Assignee: Paul Hammelmann Meschinenfabrik, Oelde, Fed. Rep. of Germany

[21] Appl. No.: 165,006

[22] Filed: Dec. 9, 1993

[30] Foreign Application Priority Data

Dec. 9, 1992 [DE] Fed. Rep. of Germany ....... 4241344

[51] Int. Cl.$^5$ .......................................... F16K 17/00
[52] U.S. Cl. ...................................... 137/467; 251/73
[58] Field of Search ........................... 137/467; 251/73

[56] References Cited

U.S. PATENT DOCUMENTS

| | | | |
|---|---|---|---|
| 2,902,046 | 9/1959 | Dollison | 251/73 X |
| 3,040,772 | 6/1962 | Todd | 251/73 X |
| 3,268,298 | 8/1966 | LaCosta et al. | 251/73 X |
| 3,409,037 | 11/1968 | Nelson | 137/467 X |
| 4,252,143 | 2/1981 | Fredd | 137/467 |

Primary Examiner—Stephen M. Hepperle
Attorney, Agent, or Firm—Darby & Darby

[57] ABSTRACT

A safety valve comprises a valve seat and a spring-loaded first control piston that is axially moveable with respect to the valve seat. The valve seat and the first control piston each having a central channel for a branched-off portion of a transported pressure medium. The first control piston central channel has an annular surface that is in fluid communication with the pressure medium. A spring is supported at one axial end by a flange of the first control piston and at an opposite axial end by a switching element. When the pressure medium reaches a predetermined operating pressure, the switching element is moved axially, through the release of an arresting mechanism, to that side which faces away from the valve seat to relieve the fluid pressure.

10 Claims, 1 Drawing Sheet

5,351,714

SAFETY VALVE FOR HIGH-PRESSURE PUMPS, HIGH-PRESSURE WATER-JET MACHINES AND THE LIKE

FIELD OF THE INVENTION

The present invention relates generally to a safety valve for high-pressure pumps, high-pressure water-jet machines and the like. More specifically, the present invention relates to a safety valve comprising a valve seat and a valve body associated with the valve seat, such that the valve remains closed absolutely tight until a predetermined pressure is reached.

1. Background of the Invention

Safety requirements for high-pressure water-jet machines require that the safety valve respond when the predetermined pressure is exceeded by 10%.

Currently, there are no safety valves on the market, which have an adequate lifetime and which can be used in a pressure range up to 4,000 bar.

2. Summary of the Invention

It is an object of the present invention to design a safety valve that can be used in a pressure range up to 4,000 bar and more, that operates with high switching precision when the set pressure is exceeded, and has a long lifetime due to low wear. It is a further object that the valve be able to respond many times without readjustment of the set or predetermined pressure limit.

According to the present invention, this object is accomplished as follows: The valve body is designed as a spring-loaded control piston, the valve seat and the control piston have a central channel for a branched-off portion of the transported pressure medium, and the control piston has an annular surface that is acted upon by a pressure medium, the spring is supported by a flange of the control piston and by a switching element, which, when the critical operating pressure is reached, can be moved, through the release of an arresting mechanism, to that side which faces away from the valve seat and suddenly opens the valve fully. The spring, together with the above-mentioned annular surface that is stressed with the pressure medium, generates the closing force of the control piston, and is thus relieved of stress, so that the control piston lifts from the valve seat and releases the pressure medium to the outflow connection piece.

The present inventive safety valve is designed so that a control piston is acted upon by a spring and furthermore has an annular surface which is acted upon by the pressure medium. The control piston closes the valve seat with a force which permits a pressure that is about 500 bar higher than the operating pressure. This guarantees that the valve seat is closed absolutely tight by the control piston.

The switching element can be arrested through a control piston, which can be moved through the pressure medium counter to the action of a spring that is pre-tensioned in accordance with the response pressure. When a switching position has been reached, the control piston takes up the arresting means of the switching element, so that the switching element is released.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DESCRIPTION OF THE PRESENTLY PREFERRED EXEMPLARY EMBODIMENTS

Figure 1:
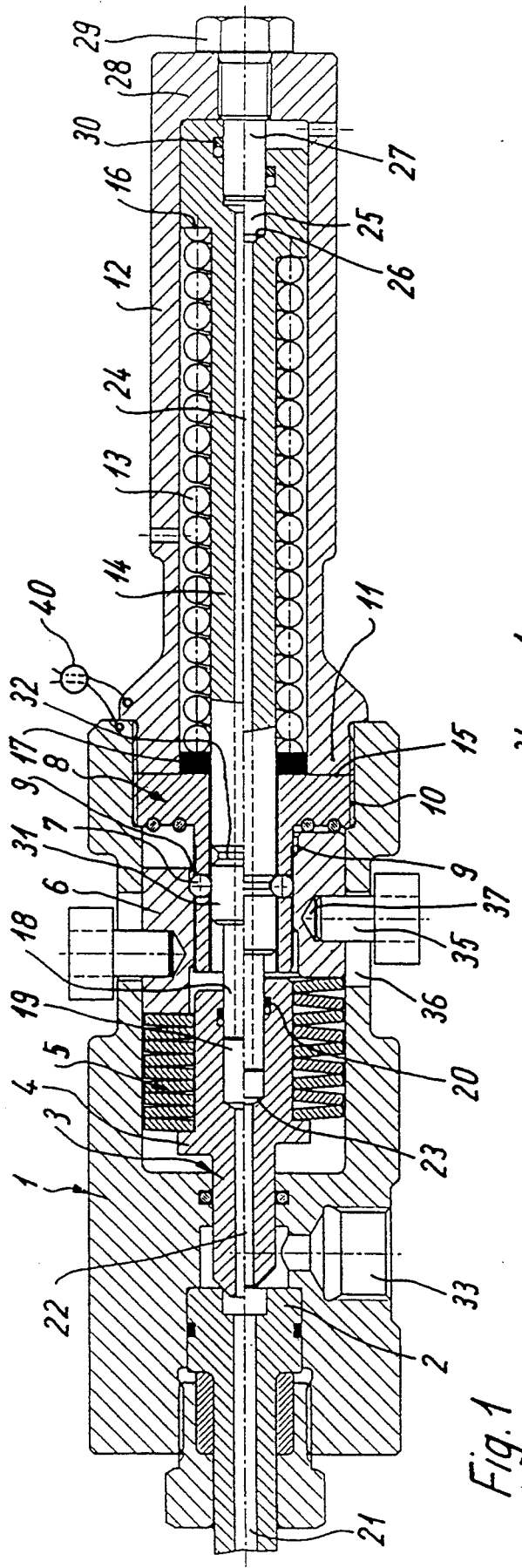
FIG. 1 is a sectional view of the safety valve, and specifically in the upper half in its closed position, and in the lower half in its open position.

Referring to FIG. 1, the safety valve has a housing 1, in which a valve seat 2 is disposed. A control piston 3 of a valve body has an annular flange 4, which supports a spring 5. In the embodiment shown here, this spring 5 is composed of several disk springs. The control piston 3 is axially movable with respect to valve seat 2, as illustrated in the upper half and lower half of FIG. 1, between a sealed or closed position, and an open position, respectively.

Spring 5 is supported by a switching element 6 at the end remove from annular flange 4. When the control piston is in its sealed position, this switching element 6 is arrested from axial movement by balls 7. Balls 7 are disposed in radial receiving holes in a guide piece 8. When the control piston 3 is in its sealed position, the balls 7 partially engage an annular recess 9 in the switching element 6.

The guide piece 8 is disposed immovably in the housing 1 by being screwed into an inside thread of the housing by means of an internally threaded flange 10. A threaded flange 11 of a housing part 12 is also screwed into this inside thread 10. Housing part 12 receives a second spring 13, which is associated with a control piston 14.

In the illustrated embodiment, spring 12 is designed as a cylindrical coil spring, which surrounds a part of the control piston 14. At one end, spring 13 is supported by a surface 15 of the guide piece 8. At an opposite end, spring 13 is supported by a surface 16 of piston 14. The pre-tension of the spring 13 can be adjusted through the use of shims 17.

Control piston 14 has a pin 18 on the side which faces the valve seat 2. This pin 18 extends into a pressure chamber 19 of the control piston 3. A gasket 20 is situated between the control piston 3 and the pin 18.

A portion of the transported pressure medium is branched-off and conducted to the safety valve through a central channel 21 of the valve seat 2. A central channel 22 of the control piston 3 is in alignment with this central channel 21. Central channel 22 terminates in a pressure chamber 19 with a large diameter section, resulting in an annular surface 23 with a hydraulic action (i.e., a hydraulic acting surface). Together with spring 5, and under the action of the pressure medium, this annular surface 23 provides the closing force for the control piston 3.

The control piston 14 has a central channel 24, extending over its entire length, and terminating in a control chamber 25, which has a larger diameter than the channel 24 and thus forms an annular surface 26 with a hydraulic action. This annular surface 26 is acted upon by the pressure medium which is conducted through the channel 24 into the control chamber 25.

A fixed guide and journal pin 27, which is part of a screw 29 that is screwed into the end disk 28 of the housing part 12, extends into the control chamber 25. A gasket 30 is situated between the control piston 14 and the guide and journal pin 27.

The upper half of FIG. 1 shows that, in the sealing position of the control piston 3, the balls 7 are arrested by a cylindrical part 31 of the control piston 40, by means of which the balls 7 are held in the recess 9 of the switching element 6. At its rear end, part 31 is bounded by a circumferential groove 32. A portion of the balls 7 are pressed into this groove 32 when the switching element 6 is released. Thus, it is necessary that the groove 32 be brought into a position in which it is aligned with the receiving holes for the balls 7 which occurs when the pressure medium exceeds the anticipated or predetermined pressure. The excess pressure acting on the annular surface 26 causes the spring 13 to collapse and the control piston 14 to move axially, and thus also its circumferential groove 32, to move in the axial direction toward the valve seat 2. A portion of the individual balls 7 is received by the groove 32 in the aligned position between the groove 32 and the receiving holes for the balls 7. Also, at this time, the switching element 6 is released, so that, under the action of the spring 5, it moves into the position which is shown in the lower half of FIG. 1. The control piston 3 thus lifts from the valve seat, so that the pressure medium can flow out through the outflow connection piece 33, and the system is relieved of pressure.

In this open position, the control piston 14 is arrested, by means of the balls 7 and switching element 6, in the position shown in the lower part of FIG. 1. The safety valve remains open, and the pressure medium (e.g., the water), can flow out freely through the outflow connection piece 33.

Figure 2:
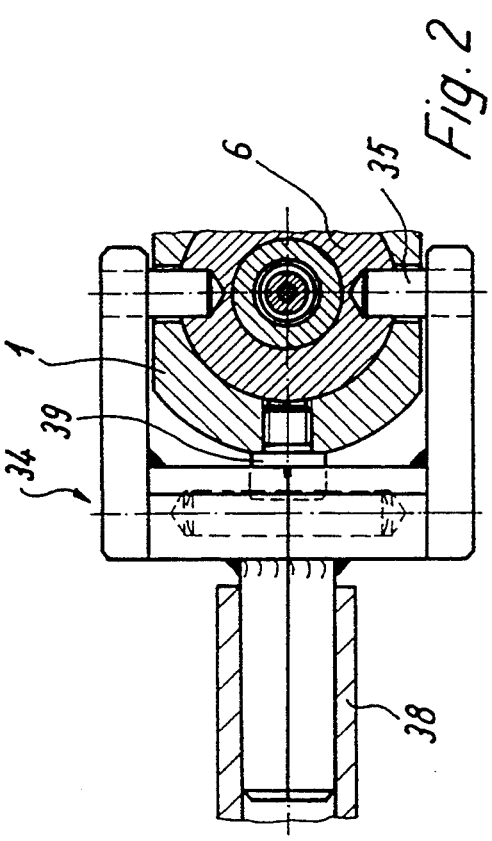
FIG. 2 is a sectional view of a two-part fork by means of which the switching element is moved into its initial position counter to the action of the associated spring.

To activate the safety valve once again and to bring the control piston 3 into its sealing position, one can use a two-part fork 34 (See FIG. 2), which has pins 35 that are conducted through the longitudinal holes 36 of the housing 1 and that are inserted into the holes 37 of the switching element 6. The parts of the fork are held together by a tube 38.

When the switching element moves, the fork is supported by a screw 39, which is fixed in the housing 1. Using the lever action resulting from this mode of support, the switching element 6 is moved in the direction toward the valve seat 2. The spring 5 is thus tensioned, and the control piston 3 assumes its sealing position. The switching element 6 continues to move in the direction toward the valve seat 2 until the balls 7 can partially enter the recess 9 of the switching element 6. The tensioned spring 13 then moves the control piston 14 back into the position which is shown in the upper half of FIG. 1. The cylindrical part 31 grips balls 7 from below, so that, through these balls, the switching element again is arrested in it starting position (i.e., the sealing position of the valve).

The safety valve is once again ready for use. After the safety valve has been activated, it is preferred that the fork 34 be removed from the valve. Additionally, a lead seal 40 prevents the predetermined operating pressure from being inadvertently changed by changing the shims 17. Of course, the predetermined pressure limit can be easily set by changing the number of shims 17 to vary the tension of spring 13.

From the foregoing description, it will be appreciated that the present invention makes available, a compact, cost efficient safety valve. The safety valve is designed to allow for simple operation while preventing a release of the fluid pressure until the predetermined pressure limit has been reached.

Having described the presently preferred exemplary embodiment of a new and improved safety valve in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What I claim is:

1. A safety valve comprising:
   a valve seat and a spring-loaded first control piston being axially moveable with respect to the valve seat, the valve seat and the first control piston each having a central channel for a branched-off portion of a transported pressure medium, and the first control piston central channel has an annular surface that is in fluid communication with the pressure medium, a spring is supported at one axial end by a flange of the first control piston and at an opposite axial end by a switching element, when the pressure medium reaches a predetermined operating pressure, the switching element is axially moveable, through the release of an arresting mechanism, to that side which faces away from the valve seat to relieve the fluid pressure.

2. The safety valve of claim 1, wherein the arresting mechanism includes a plurality of balls which are set in a plurality of radially extending receiving holes of a guide piece that is fixedly disposed in a housing, the plurality of balls extend out of the receiving hole on one side and, when the switching element is arrested, engage an annular recess of the switching element, an inner end of the receiving hole is closed by a part of a second control piston that is mounted in the guide piece so as to be axially movable, the second control piston has a circumferential groove which is brought into alignment with the receiving holes containing the balls when the pressure medium reaches a predetermined operating pressure to release the arresting mechanism of the switching element.

3. The safety valve of claim 2, wherein the second control piston has a central channel over its entire length, which is in fluid communication with the branched-off portion of the pressure medium, an end of the second control piston central channel, which faces away from the valve seat, terminates in a control chamber, a fixed guide and journal pin is disposed in said control chamber, and wherein a gasket is situated between the control piston and the guide and journal pin, and the control piston is supported by a second spring, which is pretensioned in accordance with the predetermined operating pressure.

4. The safety valve of claim 3, wherein an end of the control piston which faces toward the valve seat has a pin which is disposed in a pressure chamber of the first control piston, a gasket being situated between the first control piston and the pin.

5. The safety valve of claim 1, wherein the spring, which is situated between the control piston and the switching element, comprises of disk springs.

6. The safety valve of claim 3, wherein the second spring comprises a cylindrical coil spring, said second spring being supported at one end by a surface of the second control piston, and on the other end by a surface of the guide piece.

7. The safety valve of claim 6, wherein the pretension of the second spring can be adjusted.

8. The safety valve of claim 2, wherein, when the valve is in its open position, the second control piston is arrested by the balls, which engage the circumferential groove, and which are fixed in the groove by an inner surface of the switching element.

9. The safety valve of claim 2, wherein a two-part fork is provided to move the switching element into the valve closure position, such that a pair of pins of said fork penetrate through a pair of longitudinal holes of the housing and engage a pair of radially and outwardly extending holes of the switching element to move the switching element, said fork being supported on an abutment that is fixed to the housing.

10. The safety valve of claim 7, wherein the pretension of the second spring is adjusted by using shims.

* * * * *